(12) United States Patent
Horng et al.

(10) Patent No.: US 7,664,194 B2
(45) Date of Patent: Feb. 16, 2010

(54) COMBINING SPACE TIME BLOCK CODE (STBC) WITH SPATIAL MULTIPLEXING FOR MIMO TRANSMISSION

(75) Inventors: Jyh Chau Horng, Saratoga, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 610 days.

(21) Appl. No.: 11/313,360

(22) Filed: Dec. 20, 2005

(65) Prior Publication Data

US 2007/0140371 A1    Jun. 21, 2007

(51) Int. Cl.
*H04L 1/02* (2006.01)
*H04L 27/00* (2006.01)

(52) U.S. Cl. ........................ 375/267; 375/299

(58) Field of Classification Search ................ 375/260, 375/262, 265, 267, 285, 299, 346; 370/335, 370/342, 441
See application file for complete search history.

(56) References Cited

U.S. PATENT DOCUMENTS

| | | | | |
|---|---|---|---|---|
| 6,816,557 | B2 * | 11/2004 | Kuchi et al. | 375/299 |
| 7,215,718 | B1 * | 5/2007 | Calderbank et al. | 375/299 |
| 7,308,018 | B2 * | 12/2007 | Seeger et al. | 375/141 |
| 7,542,446 | B2 * | 6/2009 | Mehta et al. | 370/330 |
| 2002/0196842 | A1 | 12/2002 | Onggosanusi et al. | |
| 2004/0057530 | A1 * | 3/2004 | Tarokh et al. | 375/267 |
| 2006/0008031 | A1 * | 1/2006 | Vummintala et al. | 375/299 |
| 2007/0147543 | A1 | 6/2007 | Horng et al. | |
| 2008/0101493 | A1 | 5/2008 | Niu et al. | |

OTHER PUBLICATIONS

IEEE 802.11 document # 11-04-0886-06-000n, "WWiSE proposal: High throughput extension to the 802.11 Standard," Jan. 2005, pp. 1-99.
A. Ribeiro et al, "Response to Call For Proposal for P802.11n—Detailed Technical Description," doc: IEEE 802.11-04/1372r3, Motorola Labs, Jan. 2004, pp. 1-47.
S.M. Alamouti, "A simple transmit diversity technique for wireless communications," IEEE Journal on Select Areas in Communications, pp. 1451-1458, Oct. 1998, vol. 16, No. 8.
Kose, C. et al., "WWiSE proposal: High throughput extension to the 802.11 Standard," doc.: IEEE 802.11-05/0149r2, Mar. 2005, pp. 1-93.
A. Hottinen et al., "A randomization technique for nonorthogonal space-time block codes," in Proc. IEEE Veh. Techno. Conf. VTC'01 Spring, pp. 1479-1482, May 2001.
O. Tirkkonen et al., "Minimal non-orthogonality rate 1 space-time block code for 3+ Tx antennas," in Proc. IEEE 6th Int. Symp. Spread-Spectrum Tech., pp. 429-432, Sep. 2000.

(Continued)

*Primary Examiner*—Khanh C Tran
(74) *Attorney, Agent, or Firm*—Kenneth L. Sherman, Esq.; Michael Zarrabian, Esq.; Myers Andras Sherman LLP

(57) ABSTRACT

A STBC-based transmission method and transmission system provides equal protection on all data streams such that all streams operate at the same SNR. STBC and spatial multiplexing are combined in a transmitter which provides equal STBC coding protection on all data streams. Such a combination of STBC with spatial multiplexing for MIMO transmission results in performance enhancements, such as in high throughput WLANs.

35 Claims, 3 Drawing Sheets

OTHER PUBLICATIONS

Siemens: TSGR1-00-0852 "STTD coding method using up to four antennas to improve the performance of indicator channels (PICH)," Jul. 2000. (available at http://www.3gpp.org).

Nokia: TSGR1-01-0829 "Demonstration of a 4-Tx-STTD OL diversity scheme," Aug. 2001. (available at http:// www.3gpp.org.

Huawei: TSGR1-03-0016 "Performances of CL-4-Tx-STTD based on ASTTD weighting," Jan. 2003. (available at http://www.3gpp.org).

S. Zhou, G.B. Giannakis, "Optimal transmitter eigen-beamforming and space-time block coding based on channel mean feedback", IEEE Trans. Signal Processing, vol. 50, pp. 2599-2613, Oct. 2002.

S. A. Mujtaba et al., "TGn Sync Proposal Technical Specification", a contribution to IEEE 802.11, 11-04-0889-04-000n, Mar. 2005, pp. 1-162.

S. A. Mujtaba et al., TGn Sync Proposal Technical Specification, a contribution to IEEE 802.11, 11-04-889r5, May 2005, pp. 1-131.

Rupp, M. and Mecklenbrauker, C.F., "On extended Alamouti schemes for space-time coding", Oct. 2002, Wireless Personal Multimedia Communications, 2002.

Y. Xin et al., "Space-time diversity systems based on linear constellation precoding," IEEE Trans. Wireless Commun., vol. 2, pp. 294-309, Mar. 2003.

U.S. Non-Final Office Action for U.S. Appl. No. 11/316,723 mailed Nov. 13, 2008.

U.S. Final Office Action for U.S. Appl. No. 11/316,723 mailed Jun. 10, 2009.

V. Tarokh, N. Seshadri, and A. R. Calderbank, "Space-time codes for high data rate wireless communication: performance criterion and code construction", IEEE Trans. Inform. Theory, vol. 44, pp. 744-776, Mar. 1998.

V. Tarokh, H. Jafarkhani, and A. R. Calderbank, "Space-time block codes from orthogonal designs", IEEE Trans. Inform. Theory, vol. 45, No. 5, pp. 1456-1467, Jul. 1999.

D. Agarwal, V. Tarokh, A. Naguib, and N. Seshadri, "Space-time coded OFDM for high data rate wireless communication over wideband channels", in Proc. IEEE VTC '98, May 1998, pp. 2232-2236.

R. S. Blum, Y. Li, J. H. Winters, and Q. Yan, "Improved space-time coding for MIMO-OFDM wireless communications", IEEE Commun. Lett., vol. 48, pp. 1873-1878, Nov. 2001.

Y. Xin and G. B. Giannakis, "High-rate space-time layered OFDM", IEEE Commun. Lett., vol. 6, No. 5, pp. 187-189, May 2002.

Huaning Niu, Chiu Ngo, "Beamforming for Space-Time Coded IEEE 802.11n System with Known Fading Correlations", Conference record of the 39th Asilomar Conference on Signals, Systems and Computers, Nov. 2005, pp. 1014-1018, Pacific Grove, CA.

R.W. Heath Jr. et al., "A simple scheme for transmit diversity using partial channel feedback," in Proc. IEEE 32nd Asilomar Conf. Signals, Systems and Computers, pp. 1073-1078, 1998.

G. Jongren et al., "Combining beamforming and orthogonal space-time block coding," IEEE Trans. Info. Theory, vol. 48, pp. 611-627, Mar. 2002.

S. A. Mujtaba et al., "TGn Sync Proposal Technical Specification", a contribution to IEEE 802.11-04/0889r7, Jul. 2005, pp. 1-133.

* cited by examiner

US 7,664,194 B2

COMBINING SPACE TIME BLOCK CODE (STBC) WITH SPATIAL MULTIPLEXING FOR MIMO TRANSMISSION

FIELD OF THE INVENTION

The present invention relates generally to data communication, and more particularly, to data communication in multi-channel communication system such as multiple-input multiple-output (MIMO) systems.

BACKGROUND OF THE INVENTION

In a wireless communication system, MIMO techniques are widely adopted to reach higher system capacity using multiple antennas at both a transmitter and a receiver. In general, there are two categories of MIMO systems: diversity multiplexing and spatial multiplexing. The Alamouti space-time block code (STBC) can achieve full diversity for two transmit antennas with one spatial stream. However, in most cases, there are more than two transmit antennas with multiple spatial streams in a MIMO system. Therefore, combining STBC with spatial multiplexing becomes a critical issue in designing a MIMO system.

STBC is an optional feature for open loop architectures. STBC can achieve full diversity without knowledge of the channel state information (CSI) at the transmitter. For example, for consecutive symbols $S_1$ and $S_2$, the Alamouti STBC encoder is represented by a 2×2 block matrix as:

$$\begin{bmatrix} S_1 & -S_2^* \\ S_2 & S_1^* \end{bmatrix} \quad (1)$$

where S is complex and S* is conjugate of S, and elements in the same row will be transmitted from the same antenna and each column of elements will be transmitted at the same time. As such, at time 1 antenna 1 transmits $S_1$, and antenna 2 transmits $S_2$, etc.

As discussed, and shown by relation (1) above, the Alamouti STBC is suitable for two transmit antennas with one spatial data stream. In order to use STBC in a system with a higher number of transmit antennas and multiple data streams, a conventional approach attempts to combine STBC with spatial multiplexing. For a number ($N_t$) of transmit antennas equal to twice a number ($N_{ss}$) of data streams, the mapping of the data streams to the transmit antennas is straightforward because each data stream can be mapped into two transmit antennas using a 2×2 Alamouti STBC encoding block. For other cases, however, the conventional approach leads to unequal STBC protection, posing significant problems.

For example, as shown in transmitter 100 of FIG. 1, with $N_t=3$ and $N_{ss}=2$, an STBC encoder 102 according to the conventional approach maps a first data stream (Stream 1: $S_{11}$ $S_{12}$ $S_{13}$ $S_{14}$ $S_{15}$ $S_{16}$ $S_{17}$ $S_{18}$) onto transmitter antennas Tx0 and Tx1 using STBC encoding, and a second data stream (Stream 2: $S_{21}$ $S_{22}$ $S_{23}$ $S_{24}$ $S_{25}$ $S_{26}$ $S_{27}$ $S_{28}$) is mapped onto antenna Tx2 without the STBC protection. Since the first stream has diversity gain due to the use of STBC encoding, and the second stream does not, the received signals at a receiver will operate at different SNRs. However, both data streams support the same modulation and coding rate, wherein the stream without STBC protection will dominate the performance. In this case, the performance enhancement from the use of such conventional STBC encoding is very limited because any errors from any one of the streams will lead to an error packet.

There is, therefore, a need for a STBC-based transmission method with equal protection on all data streams such that all received streams operate at the same SNR. There is also a need for a method to combine STBC encoding and spatial multiplexing for performance enhancements in high throughput WLANs.

BRIEF SUMMARY OF THE INVENTION

In one embodiment the present invention provides a STBC-based transmission method with equal protection on all data streams such that all streams operate at the same SNR, wherein STBC and spatial multiplexing are combined for performance enhancements, such as in high throughput WLANs (e.g., IEEE 802.11n).

Accordingly, in one implementation the present invention provides a MIMO communication system comprising a transmitter including an STBC encoder that encodes $N_{ss}$ input streams using space-time block coding (STBC) for transmission via $N_t$ transmit antennas. When $N_t<2N_{ss}$, it applies a $N_t-N_{ss}$ number of STBC encoding operations to the $N_{ss}$ input streams at the same time. A 2×2 STBC encoding operation is applied to each of the (Nt−Nss) out of Nss input streams. There is only Nt−Nss number of 2×2 STBC operations at any time.

In implementing each STBC encoding operation, input stream symbol time and space indexes can be interchanged to generate output symbols. Therefore, one row of the STBC encoding output matrix is the same as the corresponding input stream. The transmitter further includes a switch that generates $N_t$ transmission signals from the STBC encoding output matrix values by time-switching between the output matrix values, such that at least one of the transmission signals at a time includes STBC encoded symbols of an input stream. In another case, the transmitter further includes a switch that generates $N_t$ transmission signals from the STBC encoding output matrix values by time-switching between the output matrix values, such that only one of the transmission signals at a time includes STBC encoded symbols of an input stream.

Further, the transmitter can perform spatial diversity on the STBC encoding operations. Providing spatial diversity further includes performing circular shifts in space (or equivalently, antenna) domain.

When $N_t=2N_{ss}$, a 2×2 STBC encoding operation is applied to each data stream such that each STBC encoding operation outputs symbols for two transmit antennas. When $N_t>2N_{ss}$, an encoding operation using an STBC block of n×m matrix is utilized, wherein n>2 and m>2.

The system further includes a receiver that receives the encoded streams from the transmitter, via $N_r$ receive antennas, and decodes the encoded streams using a STBC decoder that performs decoding operations on the received streams.

Using the present invention, diversity gains from STBC are equally distributed among the spatial streams to achieve better performance.

These and other features, aspects and advantages of the present invention will become understood with reference to the following description, appended claims and accompanying figures.

DETAILED DESCRIPTION OF THE INVENTION

In one embodiment the present invention provides a STBC-based transmission method with equal protection on all data streams such that all streams operate at the same SNR, wherein STBC and spatial multiplexing are combined for performance enhancements, such as in high throughput WLANs (e.g., IEEE 802.11n). Using the present invention, diversity gains from STBC encoding are equally distributed among the spatial streams to achieve better performance.

Figure 1:
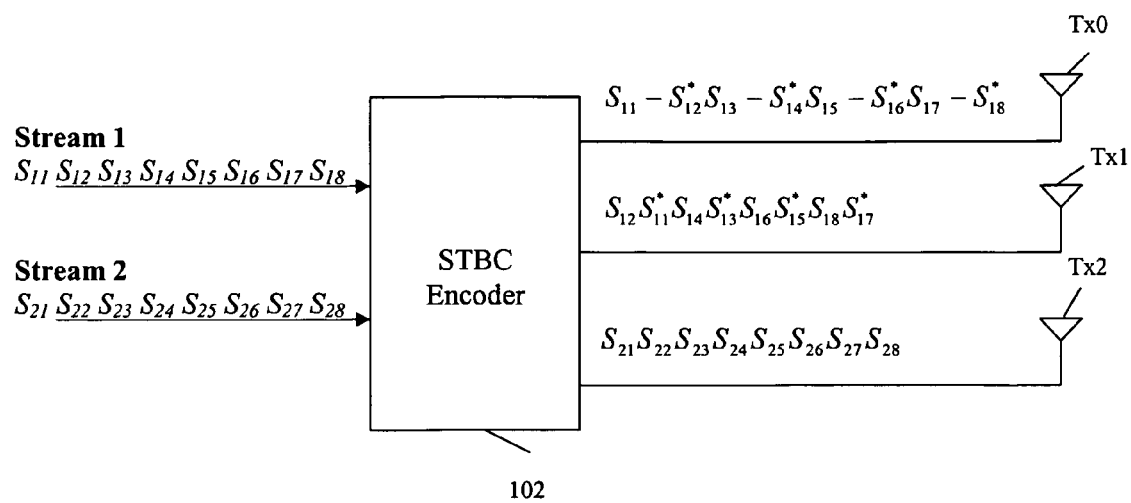
FIG. 1 shows a conventional STBC scheme with 2 streams and 3 transmit antennas.

For the example where $N_t=3$ and $N_{ss}=2$, the conventional approach has the transmission pattern for an STBC encoding as shown by the spatial-temporal relation (2) below:

$$\text{Antenna} \downarrow \begin{bmatrix} S_{11} & -S_{12}^* & S_{13} & -S_{14}^* & S_{15} & -S_{16}^* & S_{17} & -S_{18}^* \\ S_{12} & S_{11}^* & S_{14} & S_{13}^* & S_{16} & S_{15}^* & S_{18} & S_{17}^* \\ S_{21} & S_{22} & S_{23} & S_{24} & S_{25} & S_{26} & S_{27} & S_{28} \end{bmatrix} \xrightarrow{\text{Time}} \quad (2)$$

wherein $S_{ij}$ represents the orthogonal frequency division multiplexing (OFDM) symbol from $i^{th}$ stream at time $j$. Referring back to FIG. 1, all of the symbols transmitted from antenna 1 (Tx0) and antenna 2 (Tx1) are STBC coded symbols of Stream 1, whereas antenna 3 (Tx2) transmits symbols from Stream 2 without any STBC encoding protection.

In one implementation, the present invention provides equal protection on each data stream utilizing an improved STBC encoder. In order to provide equal protection among all streams, said improved STBC encoder applies STBC encoding to all data streams in a time-multiplexed manner, as shown by example spatial-temporal relation (3) below:

$$\text{Antenna} \downarrow \begin{bmatrix} S_{11} & -S_{12}^* & S_{13} & S_{14} & S_{15} & -S_{16}^* & S_{17} & S_{18} \\ S_{12} & S_{11}^* & S_{24} & S_{23}^* & S_{16} & S_{15}^* & S_{28} & S_{27}^* \\ S_{21} & S_{22} & S_{23} & -S_{24}^* & S_{25} & S_{26} & S_{27} & -S_{28}^* \end{bmatrix} \xrightarrow{\text{Time}} \quad (3)$$

wherein $S_{ij}$ represents the OFDM symbol from $i^{th}$ stream at time $j$. As such, according to the improved STBC encoder, STBC encoding applies to the first data stream at times (1, 2), (5, 6), ..., and to the second data stream at times (3, 4), (7, 8), ..., etc. Therefore, the STBC operation is uniformly distributed on each stream. Further, an improved STBC decoder in a receiver according to the present invention decodes the encoded STBC symbols. The receiver performs channel estimation, combining process (in both time and space domains), and the Maximum Likelihood (ML) detection rule (symbol-by symbol based). It is assumed that the channel coherence time is greater than the length of a block.

Such an STBC approach according to the present invention can be extended to higher numbers of transmit antennas.

When $N_t=2N_{ss}$

For a number of transmit antennas equal to twice the number of the data streams (i.e., $N_t=2N_{ss}$), according to the present invention a 2×2 STBC encoding can be applied to each data stream to support $2N_{ss}$ transmit antennas (each STBC encoding function outputs for two transmit antennas).

When $N_t>2N_{ss}$

For a number of transmit antennas higher than twice the number of the data streams (i.e., $N_t>2N_{ss}$), a larger size of STBC encoding block is selected (i.e., STBC block>2×2 of an n-by-m (n×m) matrix is selected where n>2 and m>2, which is larger than the basic STBC block of a 2×2 matrix) or combining antenna selection technique is utilized. The basic form of STBC involves 2 transmit antennas and 1 spatial stream. If $N_t>2N_{ss}$, then we can select $2N_{ss}$ transmit antennas out of $N_t$ (this is so-called antenna selection) and then apply 2 transmit antennas to each spatial stream (using the basic form of STBC).

When $N_t<2N_{ss}$

For the number of transmit antennas less than twice the number of the data streams (i.e., $N_t<2N_{ss}$), the present invention is utilized to achieve equal protections (STBC encoding) among the streams. In such a case, a $N_t-N_{ss}$ number of STBC encoding operations applied to $N_{ss}$ streams at the same time. The criterion is to apply a 2×2 STBC encoding operation to each of the $N_t-N_{ss}$ out of $N_{ss}$ input streams wherein there are only $N_t-N_{ss}$ number of 2×2 STBC operations at any time.

Figure 2:
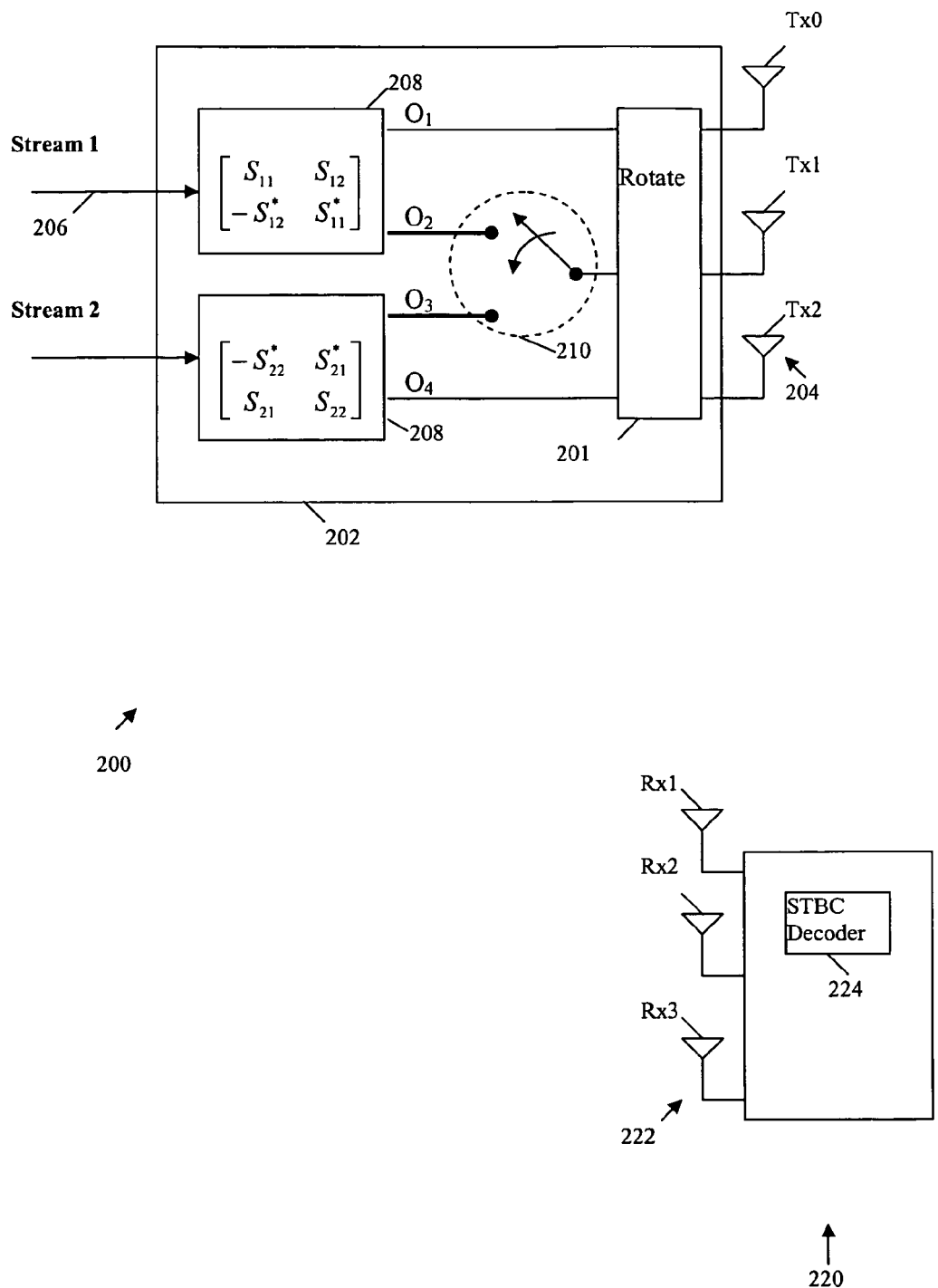
FIG. 2 shows a block diagram of an embodiment of a MIMO system according to the present invention, including a transmitter that implements an STBC encoder with $N_{ss}=2$ streams and $N_t=3$ transmit antennas.

Referring to the example transmitter 200 in FIG. 2, one implementation of the improved STBC encoder 202 according to the present invention for $N_t=3$ transmitter antennas 204 and $N_{ss}=2$ data streams 206 is achieved by using two 2×2 STBC block encoding operations 208. Each data stream 206 is first STBC encoded by a corresponding 2×2 STBC block encoding operation 208, wherein the time and the space indexes are interchanged in implementing the 2×2 STBC block encoding operations 208.

In the example herein, each STBC block comprises a block of 2 symbols. For example, after interchanging the time and space indices, the second output of the STBC encoding operation is first "$-S_{12}^* \ S_{11}^*$" from the first stream, then "$-S_{24}^* \ S_{23}^*$" from the second stream, and so on.

Mathematically, the afore-mentioned 2×2 STBC block encoding operation in the example is the transpose of the original 2×2 STBC block encoding in relation (1) above. Therefore, one row of the STBC encoding output is identical to the input stream as shown in $O_1$ or $O_4$ in FIG. 2. Using a switch 210, the transmitted signal for the second antenna (Tx1) is time-switched between the output $O_2$ and $O_3$ of the two 2×2 STBC encoders, such that only one of the streams, Stream 1 or Stream 2, is STBC encoded at any time. As such, the operation includes generating $N_t$ transmission signals from the output of each 2×2 STBC encoder by time-switching between the output, such that only one of the transmission signals at a time includes STBC encoded symbols of an input stream.

In the following, a description of the switching operation for the general case using $N_t$ and $N_{ss}$ is provided, wherein an algorithm of mapping outputs of each 2×2 encoder outputs to transmit antennas is provided.

Notation:

Tx(k,j)=Transmit antenna k at time j; where k=0 ... $N_t-1$, and j=0, 1, 2, ... at a unit of two OFDM symbols.

O(s,r,j)=Output r of 2×2 encoder block for input stream s at time j; where r={0,1}, s=0, 1, ..., $N_{ss}-1$, and j=0, 1, 2, ... at a unit of two OFDM symbols.

The following switching process pseudo-code applies to cases where $N_{ss}<N_t<=2N_{ss}$, implementing the steps of:
1. Is $N_t<N_{ss}$? If yes, stop—the system does not support this case, otherwise, continue;
2. Is $N_t=N_{ss}$? If yes, stop and use spatial multiplexing, otherwise, continue;
3. Is $N_t>2N_{ss}$? If yes, stop and use antenna selection as described above, otherwise continue;
4. Determine N_enc=$N_t-N_{ss}$ (i.e., number of 2×2 STBC encoding operation at each time instance);
5. Use the following steps:
   j=0; (i.e., time index in a unit of 2 OFDM symbols);
     For k=0 to N_enc−1, (i.e., map both of the 2×2 STBC output to Tx antenna);
       Tx([2k+j] mod $N_t$,j)=O([k+j] mod $N_{ss}$,0,j);
       Tx([2k+1+j] mod $N_t$,j)=O([k+j] mod $N_{ss}$,1,j)
     End;
     If (N_enc==$N_{ss}$), then stop—all Tx antennas are used, otherwise continue;
     For m=2N_enc+1 to N_t, (i.e., map only one of the 2×2 output to Tx antenna);
       Tx([m−1+j] mod $N_t$,j)=O([int(m/2)+j] mod $N_{ss}$, 0,j)
     End;
6. j=j+1; repeat (5).

A numerical example using the above pseudo-code is now provided:
(A) $N_t$=3, $N_{ss}$=2: N_enc=1;
   At time j=0,
     Tx(0,0)=O(0,0,0)
     Tx(1,0)=O(0,1,0)
     Tx(2,0)=O(1,0,0)
   At time j=1,
     Tx(1,1)=O(1,0,1)
     Tx(2,1)=O(1,1,1)
     Tx(0,1)=O(0,0,1)
(B) $N_t$=4, $N_{ss}$=3: N_enc=1;
   At time j=0,
     Tx(0,0)=O(0,0,0)
     Tx(1,0)=O(0,1,0)
     Tx(2,0)=O(1,0,0)
     Tx(3,0)=O(2,0,0)
   At time j=1,
     Tx(1,1)=O(1,0,1)
     Tx(2,1)=O(1,1,1)
     Tx(3,1)=O(2,0,1)
     Tx(0,1)=O(3,0,1)
(C) $N_t$=5, $N_{ss}$=3: N_enc=2
   At time j=0,
     Tx(0,0)=O(0,0,0)
     Tx(1,0)=O(0,1,0)
     Tx(2,0)=O(1,0,0)
     Tx(3,0)=O(1,1,0)
     Tx(4,0)=O(2,0,0)
   At time j=1,
     Tx(1,1)=O(1,0,1)
     Tx(2,1)=O(1,1,1)
     Tx(3,1)=O(2,0,1)
     Tx(4,1)=O(2,1,1)
     Tx(0,1)=O(0,0,1)

Other example equivalent ways include system 300 illustrated in FIG. 3 (described further below).

The equivalent STBC encoding matrix is shown by the example spatial-temporal relation (4) below:

$$\text{Antenna} \downarrow \begin{bmatrix} S_{11} & S_{12} & S_{13} & S_{14} & S_{15} & S_{16} & S_{17} & S_{18} \\ -S_{12}^* & S_{11}^* & -S_{24}^* & S_{23}^* & -S_{16}^* & S_{15}^* & -S_{28}^* & S_{27}^* \\ S_{21} & S_{22} & S_{23} & S_{24} & S_{25} & S_{26} & S_{27} & S_{28} \end{bmatrix} \xrightarrow{\text{Time}} \quad (4)$$

wherein the transmitted elements $S_{ij}$ are identical to those in relation (3) above.

In order to further improve performance, additional spatial diversity can be introduced on the coding block in relation (3) above. In one example, circular shifts (space rotation) are applied in space (or equivalently, antenna) domain (e.g., by space rotation 201 in FIG. 2 and by space rotation 301 in FIG. 3, described further below), wherein elements in each column of the encoding matrix are circular shifted by one space from previous column. As such, the coding matrix is according to relation (5) below:

$$\text{Antenna} \downarrow \begin{bmatrix} S_{11} & S_{22} & S_{24} & S_{14} & S_{25} & S_{26} & S_{17} & -S_{28}^* \\ S_{12} & -S_{12}^* & S_{23} & S_{23}^* & S_{15} & -S_{16}^* & S_{28} & S_{18} \\ S_{21} & S_{11} & S_{13} & -S_{24}^* & S_{16} & S_{15}^* & S_{27} & S_{27}^* \end{bmatrix} \xrightarrow{\text{Time}} \quad (5)$$

Again, the transmitted elements $S_{ij}$ are identical to the elements in relation (3) above, however, with space rotation (circular shift). Further, different rotation rules can be applied to relation (3) to introduce diversities (e.g., by rotating two or more spaces instead of one space etc., additional spatial diversity can be achieved). As such, example rotations in space-domain (antenna domain) according to the present invention include rotation by one antenna, by two antennas, etc.

FIG. 2 further shows an embodiment of a receiver 220 according to the present invention, which forms a MIMO communication system along with the transmitter 200. The receiver 220 includes the same number of receiving antennas 222 as the transmitter 200 for receiving STBC encoded transmissions of the transmitter 200, and an STBC decoder 224 which performs the inverse operations of the STBC encoder 202. The STBC decoder 224 decodes the encoded STBC symbols from the transmitter 200.

Figure 3:
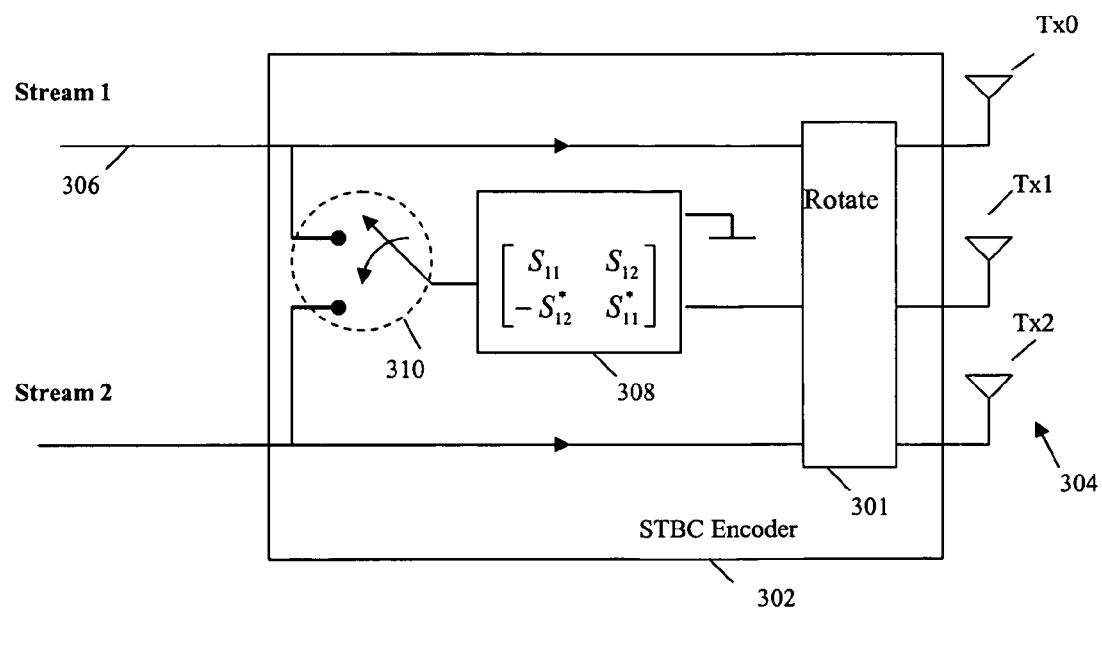
FIG. 3 shows a block diagram of another embodiment of a MIMO transmitter according to the present invention, implementing an STBC encoder with $N_{ss}=2$ streams and $N_t=3$ transmit antennas.

FIG. 3 shows a block diagram of an example transmitter 300 including another embodiment of a STBC encoder 302 according to the present invention. The STBC encoder 302 in FIG. 3 is a simplified, but equivalent, version of the STBC encoder 202 in FIG. 2, utilizing one basic STBC encoding function 308 instead of two encoding function 208 in FIG. 2.

Referring to the example transmitter 300 in FIG. 3, one implementation of the improved STBC encoder 302 according to the present invention for $N_t$=3 transmitter antennas 304 and $N_{ss}$=2 data streams 306 is achieved by using a 2×2 STBC block encoding operation 308 and a switch 310. In an example switching operation in FIG. 3, the switch 310 switches between Stream 1 and Stream 2 at a time unit of 2 OFDM symbols. Hence:

Output of Tx0=(S11,S12), (S13,S14), (S5,S6) . . .

Output of Tx2=(S21,S22), (S23,S24), (S25,S26) . . .

Output of Tx1=(−S12*,S11*), (−S24*,S23*), (−S16*, S15*), . . .

Accordingly, the present invention provides a STBC-based transmission method and encoder that provides equal STBC protection on all data streams such that all streams operate at the same SNR. In one implementation, STBC encoding and spatial multiplexing is combined for performance enhancements, such as in high throughput WLANs (e.g., IEEE 802.11n). Using the present invention, diversity gains from STBC encoding are equally distributed among the spatial streams to achieve better performance.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of encoding $N_{ss}$ input streams using space-time block coding (STBC) for transmission via $N_t$ transmitter antennas in a MIMO system, comprising:
  employing a processor for:
    applying a $N_t$-$N_{ss}$ number of 2×2 STBC encoding operations to the $N_{ss}$ input streams at the same time by performing an STBC encoding operation on each of the (Nt−Nss) out of Nss input streams,
  wherein $N_t > N_{ss}$, and when $N_t > 2N_{ss}$, a combining antenna selection technique is utilized in the encoding operations.

2. The method of claim 1, wherein there are only Nt−Nss number of 2×2 STBC operations at any time.

3. The method of claim 2 wherein in each STBC encoding operation, input stream symbol time and space indexes are interchanged to generate output matrix symbols.

4. The method of claim 3 wherein each STBC block comprises a STBC block of 2 symbols.

5. The method of claim 3 wherein in each STBC encoding operation, the time and the space indexes are interchanged in implementing the 2×2 STBC block encoding operation.

6. The method of claim 5 wherein the STBC block encoding output matrix is the transpose of the original 2×2 coding block $$\begin{bmatrix} S_1 & -S_2^* \\ S_2 & S_1^* \end{bmatrix}.$$

7. The method of claim 3 wherein one row of the STBC encoding output matrix is the same as the corresponding input stream.

8. The method of claim 3 further comprising the steps of:
  generating $N_t$ transmission signals from the STBC encoding output matrix values by time-switching between the output matrix values, such that at least one of the transmission signals at a time includes STBC encoded symbols of an input stream.

9. The method of claim 3 further comprising the steps of:
  generating $N_t$ transmission signals from the STBC encoding output matrix values by time-switching between the output matrix values, such that only one of the transmission signals at a time includes STBC encoded symbols of an input stream.

10. The method of claim 1 further comprising the steps of providing spatial diversity on the STBC encoding operations.

11. The method of claim 10 wherein providing spatial diversity further includes the steps of performing circular shifts in space, or equivalently antenna, domain.

12. The method of claim 1 wherein $N_t < 2N_{ss}$.

13. The method of claim 1 wherein when $N_t = 2N_{ss}$, a 2×2 STBC encoding operation is applied to each data stream such that each STBC encoding operation outputs symbols for two transmit antennas.

14. The method of claim 13 wherein a 2×2 STBC encoding operation is applied to each data stream to support $2N_{ss}$ transmit antennas, each STBC encoding operation outputting symbols for two transmit antennas.

15. The method of claim 1 wherein when $N_t > 2N_{ss}$, an encoding operation using an STBC block of n×m matrix is utilizes, wherein n>2 and m>2.

16. The method of claim 1 further including the steps of:
  transmitting the encoded streams;
  receiving the encoded streams in a receiver; and
  decoding the encoded streams by STBC decoding operations.

17. A MIMO communication system comprising:
  a transmitter including an STBC encoder that encodes $N_{ss}$ input streams using space-time block coding (STBC) for transmission via $N_t$ transmitter antennas by applying a $N_t$-$N_{ss}$ number of STBC encoding operations to the $N_{ss}$ input streams at the same time by performing an STBC encoding operation on each of the (Nt−Nss) out of Nss input streams,
  wherein $N_t > N_{22}$, and when $N_t > 2N_{ss}$, the transmitter utilizes a combining antenna selection technique in the encoding operations.

18. The system of claim 17, wherein there are only Nt−Nss number of 2×2 STBC operations at any time.

19. The system of claim 18 wherein in each STBC encoding operation, input stream symbol time and space indexes are interchanged to generate output matrix symbols.

20. The system of claim 19 wherein each STBC block comprises a STBC block of 2 symbols.

21. The system of claim 19 wherein in each STBC encoding operation, the time and the space indexes are interchanged in implementing the 2×2 STBC block encoding operation.

22. The system of claim 21 wherein the 2×2 STBC block encoding output matrix is the transpose of the original 2×2 coding block $$\begin{bmatrix} S_1 & -S_2^* \\ S_2 & S_1^* \end{bmatrix}.$$

23. The system of claim 19 wherein one row of the STBC encoding output matrix is same as the corresponding input stream.

24. The system of claim 19 wherein the transmitter further includes a switch that generates $N_t$ transmission signals from the STBC encoding output matrix values by time-switching between the output matrix values, such that at least one of the transmission signals at a time includes STBC encoded symbols of an input stream.

25. The system of claim 19 wherein the transmitter further includes a switch that generates $N_t$ transmission signals from the STBC encoding output matrix values by time-switching between the output matrix values, such that only one of the transmission signals at a time includes STBC encoded symbols of an input stream.

26. The system of claim 17 wherein the transmitter further performs spatial diversity on the STBC encoding operations.

27. The system of claim 26 wherein providing spatial diversity further includes performing circular shifts in space, or equivalently antenna, domain.

28. The system of claim 27 wherein the transmitter further performs circular shifts in space, or equivalently antenna, domain on one antenna.

29. The system of claim 27 wherein the transmitter further performs circular shifts in space, or equivalently antenna, domain on two antennas.

30. The system of claim 27 wherein the transmitter further performs circular shifts in space, or equivalently antenna, domain on multiple antennas.

31. The system of claim 17 wherein $N_t < 2N_{ss}$.

32. The system of claim 17 wherein when $N_t = 2N_{ss}$, a 2×2 STBC encoding operation is applied to each data stream such that each STBC encoding operation outputs symbols for two transmit antennas.

33. The system of claim 32 wherein a 2×2 STBC encoding operation is applied to each data stream to support $2N_{ss}$ transmit antennas, each STBC encoding operation outputting symbols for two transmit antennas.

34. The system of claim 17 wherein when $N_t > 2N_{ss}$, an encoding operation using an STBC block of n×m matrix is utilizes, wherein n>2 and m>2.

35. The system of claim 17 wherein:
the transmitter further transmits the encoded streams;
the system further comprises a receiver that receives the encoded streams via $N_r$ receive antennas, and decodes the encoded streams using a STBC decoder that performs decoding operations on the received streams.

* * * * *